Patented July 12, 1938

2,123,542

UNITED STATES PATENT OFFICE 2,123,542

TREATMENT OF INHIBITORS

Jacque C. Morrell, Chicago, Ill., assignor to Universal Oil Products Company, Chicago, Ill., a corporation of Delaware No Drawing. Application December 20, 1934, Serial No. 758,445

7 Claims. (Cl. 23—239)

This invention relates more particularly to the treatment of inhibitors comprising tars or fractions thereof distilled from various types of woods, particularly hardwoods.

In a more specific sense the invention is concerned with a process of treatment whereby the inhibiting value of these tars or tar fractions when used in unstable gasolines is considerably increased.

Inhibiting materials in use at the present time are of varying physical and chemical properties, some being synthesized chemical compounds and others being of a semi-refined or mixed character. Some are solid at ordinary temperatures and others are liquid and their relative solubilities in hydrocarbons and in water vary considerably, as does their inhibiting potency measured in terms of the retardation in loss of properties which they are able to effect. The deterioration of unstable gasolines such as cracked gasolines under average storage conditions, particularly when there is access of both light and oxygen, is evidenced by the appearance of color, the formation of gum and resinous materials some of which may ultimately precipitate on prolonged standing, and a loss in antiknock value. Analytical and test work has practically established that these changes are due to a primary formation of peroxides by the addition of an oxygen molecule at the double bonds of conjugated diolefins, these peroxides instigating an extensive series of chain reactions leading to the formation of polymers of the aforesaid diolefins and finally to the polymerization of some mono-olefins, along with other reactions of a more or less complicated character whose exact nature is not easily determined.

The effect of inhibitors or antioxidants upon the slowing up of these reactions of deterioration is apparently due to their preferential affinity for the oxygen in the initially-formed peroxides so that the reactions of polymerization, etc., are definitely prevented as long as the inhibitor itself is not entirely consumed. By the proper use of selected inhibitors in quantities varying with the chemical nature of the unstable gasolines, particularly in regard to their diolefin content, it is readily possible at the present time to preserve the desirable properties of gasolines over the normal period of storage in refineries, which may run from approximately two to six months.

Wood tar inhibitors, with the treatment of which the present invention is concerned, have been found to be particularly efficient in arresting the deterioration of cracked gasolines, and the use of these relatively efficient and cheap and readily procurable materials, as disclosed in Patents 1,889,835 and 1,889,836, marked a distinct advance in the inhibiting art. While practically all the oily distillates produced in the distillation of woods have some efficiency in this regard, it has been found that the tars from hardwoods are generally better than those from soft woods and moreover that selected fractions, corresponding generally to what may be termed a heart cut, of the settled tars (usually boiling within the approximate ranges of 425 to 572° F.) have the greatest potency, which normally passes through a very definite maximum at some boiling temperature within this interval.

The yields and quality of inhibitor fractions from wood tars are somewhat limited by the foregoing considerations and also by the fact that they may at times contain, as a result of poorly regulated primary distillation, substantial percentages of heavy pitchy materials which affect somewhat the clarity and the color of gasolines in which the wood tars are used, particularly in cases when the use of percents of the order of from 0.05 to 0.1 is necessary, as in the case of extensively deteriorated gasolines in which the formation of peroxides has progressed to an undesirable degree.

Furthermore it is recognized that not all the constituents of wood tars possess anti-oxygenic properties, this being more lacking in the lower-boiling oily wood distillates than in the intermediate cuts mentioned. It has been found that, by the use of the present process, the overall boiling range of primary wood tars is raised and the total percentage of the more valuable inhibiting fractions is materially increased by the various chemical changes which take place as a result of the operation of the process. The resultant product is also improved in color and other properties.

In one specific embodiment the present invention comprises the treatment of wood tars or fractions thereof, and particularly those fractions boiling below 425° F. with a halide of hydrogen and more particularly with halogen acids or with a halogen and steam in the presence of metals reactive therewith to improve their inhibiting value. Treatments are conducted preferably under liquid phase conditions. The various treatments are not to be considered as exact equivalents.

By the use of the above described process it has been found that the inhibiting potency of wood tar fractions is materially increased as will be shown in later examples. This has been demonstrated by laboratory and storage tests, and particularly by the use of the so-called oxygen bomb test, which is an accelerated test employing oxygen under pressure at 212° F. and which indicates the period of time preceding a measurable rate of oxygen absorption as the "induction period" of a given gasoline. The use of inhibitors extends the induction period and the possession of an induction period of over 240 minutes has been tentatively adopted as indicating a satisfactory gasoline under average conditions of refinery storage. This has been determined by a large amount of experimental work in which induction periods were correlated with results obtained under actual storage conditions. The amount of a given inhibitor necessary for properly stabilizing any gasoline is, in general, inversely proportional to the induction period which it produces, and consequently when the potency of a wood tar fraction has been increased by the present process, similar relationships hold and there is also less danger in the matter of increased color and a gummy residue which may be left on evaporation when the fuel is employed in internal combustion engine carburetors.

The operating details of the present process as applied to the treatment of wood tar fractions are comparatively simple and the process may be conducted in well-known forms of equipment. In the simplest case, a wood tar fraction is heated to a moderately elevated temperature, either alone or dissolved in a suitable solvent, finely divided metals are maintained in suspension in the liquid either by ebullition when operations are conducted under refluxing conditions, or by mechanical stirring devices otherwise, and halogen acids are gradually added until the proper quantity has been used to produce the desired improvement in quality of the tar. As a rule, the gradual addition of the required quantities of acid is better than starting the treatment with the required quantities present and controlling the rate of reaction by the rise in temperature until a point is reached corresponding to the completion of the reactions. The acids may be injected below the surface of the liquid tar or tar solution through distributing devices such as perforated sprays, or they may be vaporized and similarly introduced. While it is generally most convenient to add the aqueous solutions of the acids, it is within the scope of the invention to add the substantially anhydrous acid gases and either steam or water separately.

Since the temperatures required for the treatments are not excessive, usually falling within the range of approximately 200 to 400° F., there is generally no advantage to be gained in the use of superatmospheric pressures. When solvents are employed, such as, for example, acetic or other acids of the aliphatic group, it is usually most convenient to maintain the solution of tar undergoing treatment under refluxing conditions at the normal boiling point of the solvent which would be, for example, about 120° C. in a case of acetic acid at atmospheric pressure or higher at superatmospheric pressures. This solvent is of particular value on account of its property of dissolving both wood tars and halogen acids, so that treatments may be conducted under homogeneous liquid phase conditions.

As an alternative method of operation, fractions of wood tar dissolved in suitable solvents along with controlled proportions of halogen acids may be heated to a moderate temperature and passed through stationary contact materials comprising finely divided metals. This type of operation may obviously be made continuous, the step of contacting with the metals being followed by fractionation of the reaction products to recover any excess of halogen acid, the solvent and the desired intermediate fractions of the wood tar, while leaving the heavier portions as a solid or semisolid residue.

A number of different metals and their alloys and mixtures may be employed as the stationary contact masses in the treating chambers. Among these may be mentioned particularly those above hydrogen in the electro-chemical series and in this group the so-called heavy metals such as for example: aluminum, manganese, zinc, chromium, iron, cadmium, cobalt, nickel, and tin. These metals react to a varying extent with halogen acids and it is obvious that the treatment may be varied by the choice of halogen acid and the choice of a single metal or a metal mixture so that a number of alternative modes of treatment are possible, without, however, placing them upon an equivalent basis. Good results are obtainable by the use of alloys or mixtures of metals above and below hydrogen. For example the use of commercial brasses and bronzes has been found to be entirely practicable and productive of good treating effects. The metals or their alloys may conveniently be employed in the form of turnings or granules and may be, if desired, mixed with or deposited upon relatively inert materials, generally of a siliceous character such as, for example fuller's earth, pumice, crushed firebrick, clays, kieselguhr, etc.

The term halogen acid as used in the present instance, includes hydrochloric acid, hydriodic acid, and hydrobromic acid, the other member of the group, to wit hydrofluoric acid, being too vigorous in its action for present purposes although it may be employed under some conditions. The acids may be further designated as aqueous solutions of the corresponding hydrogen halides, since moisture is apparently essential to the furthering of the desired treating reactions and the acids are most conveniently introduced in the form of aqueous solutions, although it is within the scope of the present process to introduce the substantially anhydrous acid vapors along with regulated amounts of steam or water to induce the desired treating effects, as already mentioned or to use hydrogen halides as such. The last modification is not the exact equivalent to the others.

The amount of any one of the halogen acids, for example hydrochloric acid, which is necessary to effect an optimum treating action in the presence of a particular metal or metal mixture is seldom predictable on a chemical and analytical basis, owing to the complex and variable character of the wood tar fractions which may be subjected to treatment. It is usually best to base large-scale operations upon the results of laboratory or semi-plant scale tests. While the three halogen acids mentioned may be used alternatively with somewhat analogous results, it is not intended to infer that their actions are identical or exactly equivalent. The possibility of using any one of the three halogen acids along with a number of different metals or combinations thereof gives a large number of possible treating combinations applicable to different wood tars or wood tar fractions.

The exact nature of the chemical reactions occurring during the treatment are not known although it is believed that reactions of the character of dealkylation, shifting of the alkyl groups, polymerization and others occur.

As a rule, hydrochloric acid is preferable over hydriodic or hydrobromic acids on account of its effective action to produce the results desired, its cheapness and its availability. The amount of acids necessary for effecting treatments is of the order of 10 per cent by weight of the tar fractions, calculated on a basis of the anhydrous hydrogen halide. If acids are used in excess, either in batch or continuous treatments, the unused material may be recovered and recirculated.

The reactions occurring in the treatment of wood tars of the present process are evidently of a very complicated character from a chemical standpoint and are difficult to follow on an analytical basis. It is uniformly observed, however, that the overall boiling range of a particular tar or fraction thereof is raised, that the inhibiting potency of any particular cut is higher and that in the case of fractions boiling below approximately 425° F., or longer boiling range fractions containing substantial percentages of these low-boiling cuts, that the percentage of optimum boiling range fractions from an inhibiting standpoint is increased. On the side of the acid and metals, there is evidently some salt formation by the interaction of the acids and the metallic contact materials, though the extent to which this occurs will vary in each particular instance. It is believed that the metals also function as catalysts for the various reactions.

The following examples showing the results obtained by the application of the present process are illustrative, but the scope of the invention is not to be considered as limited by the particular numerical data given.

Example 1

In this instance a hardwood tar having 50 per cent by volume boiling within the range of 356–425° F. and 34 per cent by volume boiling between 425–572° F., was taken for treatment. The inhibiting value of the light and intermediate fractions was taken as proportional to the increase in induction period in the currently used oxygen bomb test produced by the addition of 0.05 per cent of the fraction to a paraffinic cracked gasoline. In the case of the lower boiling fraction the increase in the time to measurable oxygen absorption was 270 minutes, while that produced by the heavier fraction mentioned was 960 minutes.

This tar was heated at atmospheric pressure to a temperature of about 300° F. in the presence of brass turnings, and concentrated hydrochloric acid was gradually introduced below the surface of the tar until an amount equal to about 10 per cent by weight of the tar had been added. The vaporization of the acid and the evolution of some gaseous reaction products served to keep the tar well mixed and contacted with the alloy.

The products from the above treatment were subjected to fractionation and it was found after separation of fixed gases, acid aqueous layer and high boiling range pitches that the percentage of material boiling below 425° F. had been reduced to 26 per cent of the whole tar, while the fraction boiling between 425–572° F. had been increased to 52 per cent on the same basis. The inhibiting values measured by the increased induction periods were 460 and 1280 minutes, respectively, using 0.05% of inhibitor by weight of the gasoline.

Both fractions were found to have a much lighter color than the corresponding boiling range cuts from the original tar, and improved color stability.

Example 2

In this instance a fraction of wood tar boiling in the approximate range of 200 to 425° F. was treated. This was dissolved in an approximately equal volume of glacial acetic acid and heated to a temperature slightly below the boiling point of the acid, to wit about 240° F., in the presence of about 5 per cent by weight of zinc dust. Concentrated aqueous hydrobromic acid was then gradually introduced below the surface of the tar solution until approximately 12 per cent by weight of the tar had been added. The treated products were then fractionated to remove solvent and recover the wood tar fraction as an intermediate cut, while leaving behind inorganic reaction products and heavy pitchy material.

The low boiling fraction subjected to the above described treatment had an inhibiting effectiveness corresponding to an increase of about 200 minutes when used in an amount of 0.03 per cent by weight of the paraffinic cracked gasoline. The wood tar recovered as an intermediate fraction between the boiling off of the solvent and the formation of the pitchy residue was found to be equal to 92 per cent by weight of the original material, although 60 per cent of the tar now boiled within the range of 425 to 572° F. The induction period increase produced by using 0.03 per cent of the recovered tar was found to be 750 minutes. Both the color and the color stability of the tar fraction were improved by the treatment and the color effect on the originally water-white gasoline was practically negligible.

The features and commercial advantages of the present process will be obvious from the foregoing specification and the examples introduced to show numerically the results obtainable in practice, although neither section is to be construed as imposing undue limitations on its generally broad scope.

I claim as my invention:

1. A process for increasing the inhibiting value of wood tars having anti-oxygenic properties and oily distillates thereof, which comprises treating the tar material with a hydrogen halide in the presence of a metal reactive with the halide.

2. A process for increasing the inhibiting value of wood tars having anti-oxygenic properties and oily distillates thereof, which comprises treating the tar material with hydrogen chloride in the presence of a metal reactive with the hydrogen chloride.

3. A process for increasing the inhibiting value of wood tars having anti-oxygenic properties and oily distillates thereof, which comprises treating the tar material with aqueous hydrogen chloride in the presence of a metal above hydrogen in the electro-chemical series.

4. A process for increasing the inhibiting value of wood tars having anti-oxygenic properties and oily distillates thereof, which comprises treating the tar material substantially in liquid phase with hydrochloric acid in the presence of a metal reactive with the acid.

5. A process for increasing the inhibiting value of wood tars having anti-oxygenic properties and oily distillates thereof, which comprises treating the tar material substantially in liquid phase with hydrochloric acid in the presence of a metal above hydrogen in the electro-chemical series.

6. A process for increasing the inhibiting value of wood tars having anti-oxygenic properties and oily distillates thereof, which comprises treating the tar material with aqueous hydrogen chloride in the presence of a metallic contact material comprising zinc.

7. A process for increasing the inhibiting value of wood tars having anti-oxygenic properties and oily distillates thereof, which comprises treating the tar material substantially in liquid phase and and at a temperature of from about 200 to 400° F. with hydrochloric acid in the presence of a metallic contact material comprising zinc.

JACQUE C. MORRELL.